United States Patent
Kamano et al.

(10) Patent No.: US 11,292,509 B2
(45) Date of Patent: Apr. 5, 2022

(54) STEERING DEVICE

(71) Applicant: TOYOTA JIDOSHA KABUSHIKI KAISHA, Toyota (JP)

(72) Inventors: Hirotaka Kamano, Susono (JP);
Yoshikazu Kameda, Gotenba (JP);
Mitsuyuki Ouchi, Mishima (JP);
Nobuyuki Kawabata, Toyota (JP);
Nobuaki Miyazaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/015,630

(22) Filed: Sep. 9, 2020

(65) Prior Publication Data
US 2021/0197888 A1    Jul. 1, 2021

(30) Foreign Application Priority Data

Dec. 26, 2019    (JP) .............................. JP2019-235921

(51) Int. Cl.
*B62D 5/04*    (2006.01)
*B62D 3/12*    (2006.01)
(Continued)

(52) U.S. Cl.
CPC ............. *B62D 5/0448* (2013.01); *B62D 3/12* (2013.01); *B62D 5/0421* (2013.01)

(58) Field of Classification Search
CPC ... B62D 3/06; B62D 3/08; B62D 3/12; B62D 5/0445; B62D 5/0448; B62D 5/0421;
(Continued)

(56) References Cited

U.S. PATENT DOCUMENTS

2017/0349205 A1* 12/2017 Kaneko ................ B62D 5/0448
2020/0262470 A1*  8/2020 Kondo ................. B62D 5/0454
2020/0290665 A1*  9/2020 Toyoda .................... B62D 5/04

FOREIGN PATENT DOCUMENTS

JP    53-116634 A    10/1978
JP    2007-118804 A    5/2007
(Continued)

*Primary Examiner* — Jonathan Ng
*Assistant Examiner* — Daniel M. Keck
(74) *Attorney, Agent, or Firm* — Sughrue Mion, PLLC

(57) ABSTRACT

To provide a steering device capable of highly precisely controlling turning angles of steered wheels without changing a layout of members. Provided is a steering device (10A) including: a center arm (26) having one end portion configured to swing in a right-and-left direction with respect to a vehicle body (BD) in synchronism with rotation of a steering shaft (22); a rod member (40A), which is coupled to the one end of the center arm (26), and is configured to move in the right-and-left direction, to thereby change turning angles of steered wheels (WR and WL); and a rod-member drive device (50) configured to linearly move the rod member (40A) in the right-and-left direction through use of a driving force source. The rod member (40A) is supported such that movement of the rod member (40A) in the right-and-left direction of the vehicle body (BD) is allowed, but movement of the rod member (40A) in a front-and-rear direction and an up-and-down direction of the vehicle body (BD) is restricted. The one end portion the center arm (26) and the rod member (40A) are coupled so as to be relatively movable in the front-and-rear direction of the vehicle body (BD).

7 Claims, 7 Drawing Sheets

(51) Int. Cl.
*B62D 7/08* (2006.01)
*B62D 7/20* (2006.01)
*B62D 7/16* (2006.01)
*B62D 7/18* (2006.01)

(58) Field of Classification Search
CPC ...... B62D 5/0424; B62D 5/0427; B62D 7/08; B62D 7/20; B62D 7/22; B62D 17/00; B62D 19/00
See application file for complete search history.

(56) References Cited

FOREIGN PATENT DOCUMENTS

JP            2019-038383 A     3/2019
WO     WO-2020111997 A1 *   6/2020   ......... B62D 5/0418

* cited by examiner

STEERING DEVICE

BACKGROUND OF THE INVENTION

1. Field of the Invention

The present invention relates to a steering device of a ball-nut type for a vehicle including a pitman arm.

2. Description of the Related Art

Hitherto, there has been used a steering device of a ball nut type for a vehicle of a so-called cab over-engine type. The steering device of the ball-nut type is configured to transmit rotation of a steering wheel to knuckle arms through members such as a ball nut, a pitman arm, a drag link, a center arm, rod members, and tie rods, to thereby change turning angles (steered angles) of steered wheels (see Japanese Patent Application Laid-open No. 553-116634). Meanwhile, as another configuration of the steering device of the ball-nut type, there has been known a configuration in which a drive device (motor actuator) is arranged for each of right and left ball nuts to apply a steering assist force through use of those drive devices (see Japanese Patent Application Laid-open No. 2007-118804).

However, in the related-art steering device configured to apply the force of the drive devices to the ball nuts, a large number of members such as the pitman arm, the drag link, the center arm, the rod members, and the tie rods are interposed between the drive devices and the steered wheels, with the result that the rigidity of a transmission path of the force is low. Thus, for example, when the steered angles are controlled through use of the drive devices, steered angles are not uniquely determined with respect to control amounts (operation amounts) of the drive devices in some cases, and it is thus difficult to precisely control the steered angles of the wheels. Therefore, there is a problem that it is not easy to perform autonomous driving, which requires precise control of steered angles, through use of the steering device.

SUMMARY OF THE INVENTION

The present invention has been made to deal with the above-mentioned problem. That is, one object of the present invention is to provide a steering device of a ball-nut type for a vehicle, which is capable of precisely controlling tuning angles of steered wheels and can suitably be used in a cab over-engine vehicle and the like.

In order to solve the above-mentioned problem, according to at least one embodiment of the present invention, there is provided a steering device (10A or 10B) of a ball-nut type for a vehicle, including: a steering gear box (23) of a ball-nut type configured to convert rotation of a steering wheel (21) to a swing of a pitman arm (24); a swing member (center arm (26)), which is supported, with respect to the vehicle body (BD), so as to be swingable at a predetermined swing center point (PC) of a vehicle body (BD), and is coupled to the pitman arm (24), the swing member being configured to swing with the swing center point (PC) as a fulcrum in synchronism with the pitman arm (24); a rod member (40A or 40B), which is coupled to the swing member (center arm (26)), a left knuckle arm (62L) configured to support a left steered wheel (WL), and a right knuckle arm (62R) configured to support a right steered wheel (WR), and is supported so as to move in a right-and-left direction of the vehicle body (BD) with respect to the vehicle body (BD), the rod member being configured to move in the right-and-left direction, to thereby change turning angles of the left steered wheel (WL) and the right steered wheel (WR); a rod-member drive device (50 or 63), which is engaged with the rod member (40A or 40B), and is configured to generate power for moving the rod member (40A or 40B) in the right-and-left direction of the vehicle body (BD); and a guide member (54c or 70c) configured to allow the movement of the rod member (40A or 40B) in the right-and-left direction of the vehicle body (BD) and restrict movement of the rod member (40A or 40B) in a front-and rear direction of the vehicle body (BD) and an up-and-down direction of the vehicle body (BD). The swing member (center arm (26)) and the rod member (40A or 40B) are coupled to or engaged with each other so that a distance (X) between the swing center point (PC) and the rod member (40A or 40B) remains unchanged even when the swing member (center arm (26)) swings, and that a force in the right-and-left direction of the vehicle body (BD) is applied from the swing member (center arm (26)) to the rod member (40A or 40B) when the swing member (center arm (26)) swings.

The steering device (10A or 10B) according to the present invention is configured to linearly move the rod member (40A or 40B) in the right-and-left direction through use of the rod-member drive device (50 or 63), to thereby change the turning angles of the right and left steered wheels (WR and WL). With this configuration, a movement amount (drive amount) of the rod member (40A or 40B) by the rod-member drive device (50 or 63) can directly be controlled, and the turning angles of the right and left steered wheels (WR and WL) can thus highly precisely be controlled. Moreover, the swing member (center arm (26)) and the rod member (40A or 40B) are coupled to or engaged with each other so that the distance (X) between the swing center (PC) and the rod member (40A or 40B) remains unchanged even when the swing member (center arm (26)) swings. Therefore, even when the rod-member drive device (50 or 63) is fixed to the vehicle body (BD) so that the movement of the rod member (40A or 40B) in the front-and-rear direction is restricted, the swing of the swing member (center arm (26)) can be transmitted to the rod member (40A or 40B). Therefore, a drive device configured to linearly move the rod member (40A or 40B) in the right-and-left direction can be applied as the rod-member drive device (50 or 63) configured to drive the rod member (40A or 40B).

According to one aspect of the present invention, the rod member (40A or 40B) includes a coupling portion (40L) having a long hole (401), which is parallel with a plane defined by the rod member (40A or 40B) and the swing center point (PC), and has a length direction in a predetermined direction intersecting an axis of the rod member (40A or 40B). The swing member (center arm (26)) includes a coupling protrusion portion (26a), which projects from the swing member (center arm (26)), and has a distal end portion inserted into the long hole (401) so as to relatively move in the length direction of the long hole (401). The swing member (center arm (26)) and the rod member (40A or 40B) are coupled to each other through the coupling portion (40L) and the coupling protrusion portion (26a).

According to one aspect of the present invention, the predetermined direction is the front-and-rear direction of the vehicle body (80).

With this configuration, the swing member (center arm (26)) and the rod member (40A or 40B) cannot be displaced relative to each other in the right-and-left direction (that is, the drive direction of the rod member (40A or 40B) by the swing member (center arm (26)), but can be displaced relative to each other in the front-and-rear direction. Therefore, even when the movement of the rod member (40A or 40B) in the front-and-rear direction is restricted, the swing of the swing member (center arm (26)) can be transmitted to the rod member (40A or 40B). Moreover, with this configuration, the swing member (center arm (26)) and the rod member (40A or 40B) can be coupled so as to relatively move in the front-and-rear direction of the vehicle body (BD) without interposition of other coupling members between the swing member (center arm (26)) and the rod member (40A or 40B).

According to one aspect of the present invention, the distal end portion (263) of the coupling protrusion portion (26a) is a spherical body, and is configured to move in the length direction of the long hole (401) and turn along a surface of the spherical body with respect to the rod member (40A or 40B). The coupling portion (40L) includes a coupling-protrusion-portion biasing member (compression coil springs (403a and 403b)) configured to elastically bias the distal end portion (263) to a middle position of the long hole (401) in the length direction.

With this configuration, the swing member (center arm (26)) and the rod member (40A or 40B) can move relative to each other smoothly even when a relative direction between the swing member (center arm (26)) and the rod member (40A or 40B) changes due to a deformation of the vehicle body (BD) and the like. Moreover, with the configuration in which the coupling protrusion portion (26a) is elastically biased by the coupling-protrusion-portion biasing members (compression coil springs (403a and 403b)) to the middle position of the movable range in the length direction of the long hole (401), kickback transmitted from the rod member (40A or 40B) to the swing member (center arm (26)) can be reduced.

According to one aspect of the present invention, the guide member (54c or 70c) is configured to elastically bias the rod member (40A or 40B) in a direction perpendicular to an axial direction of the rod member (40A or 40B) through use of a biasing force of a rod-member biasing member (54d or 70d).

With this configuration, generation of noise can be prevented or suppressed when the rod member (40A or 40B) operates.

According to one aspect of the present invention, the rod-member drive device (50) includes: a drive source (electric motor (53)); a thread groove (41) formed in an outer peripheral surface of the rod member (40A or 40B); and a ball nut (52), which is mounted to an outer periphery of the rod member (40A) so as to rotate relative to the rod member (40A), and is configured to engage with the thread groove (41) through intermediation of balls. The drive source (electric motor (53)) is configured to drive the ball nut (52) to rotate, to thereby linearly move the rod member (40A).

Further, according to one aspect of the present invention, the rod-member drive device (63) includes: a drive source (electric motor (67)); a rack (66) formed in an outer peripheral surface of the rod member (40B) along a length direction of the rod member (40B); and a pinion (65), which is supported so as to rotate with respect to the vehicle body (BD), and is configured to mesh with the rack (66). The drive source (electric motor (67)) is configured to drive the pinion (65) to rotate, to thereby linearly move the rod member (40B) in the right-and-left direction of the vehicle body (BD).

With this configuration, the rod member (40A or 40B) can directly be driven, and the movement amount of the rod member (40A or 40B) can thus highly precisely be controlled.

In the above description, in order to facilitate understanding of the present invention, a name and/or reference numeral used in the embodiments of the present invention is enclosed in parentheses and assigned to each of the constituent features of the present invention corresponding to the embodiments. However, each of the constituent features of the present invention is not limited to the embodiments defined by the name and/or reference numeral.

DESCRIPTION OF THE EMBODIMENTS

Steering devices according to embodiments of the present invention are steering devices of a ball-nut type suitable for a vehicle of a cab over engine type. The vehicle of the cab-over-engine type is a vehicle in which a driver's seat is positioned above or in front of a power generation device for the vehicle, such as an internal combustion engine or an electric motor. In the following, a front and-rear direction, an up-and-down direction, and a right-and-left direction refer to a front and-rear direction of a vehicle body (vehicle), an up-and-down direction of the vehicle body, and a right-and-left direction of the vehicle body, respectively. In drawings, as appropriate, a front direction of the vehicle body is indicated by an arrow Fr, a rear direction of the vehicle body is indicated by an arrow Rr, a right direction of the vehicle body is indicated by an arrow R, a left direction of the vehicle body is indicated by an arrow L, an up direction of the vehicle body is indicated by an arrow Up, and a down direction of the vehicle body is indicated by an arrow Dw.

First Embodiment

Figure 1:
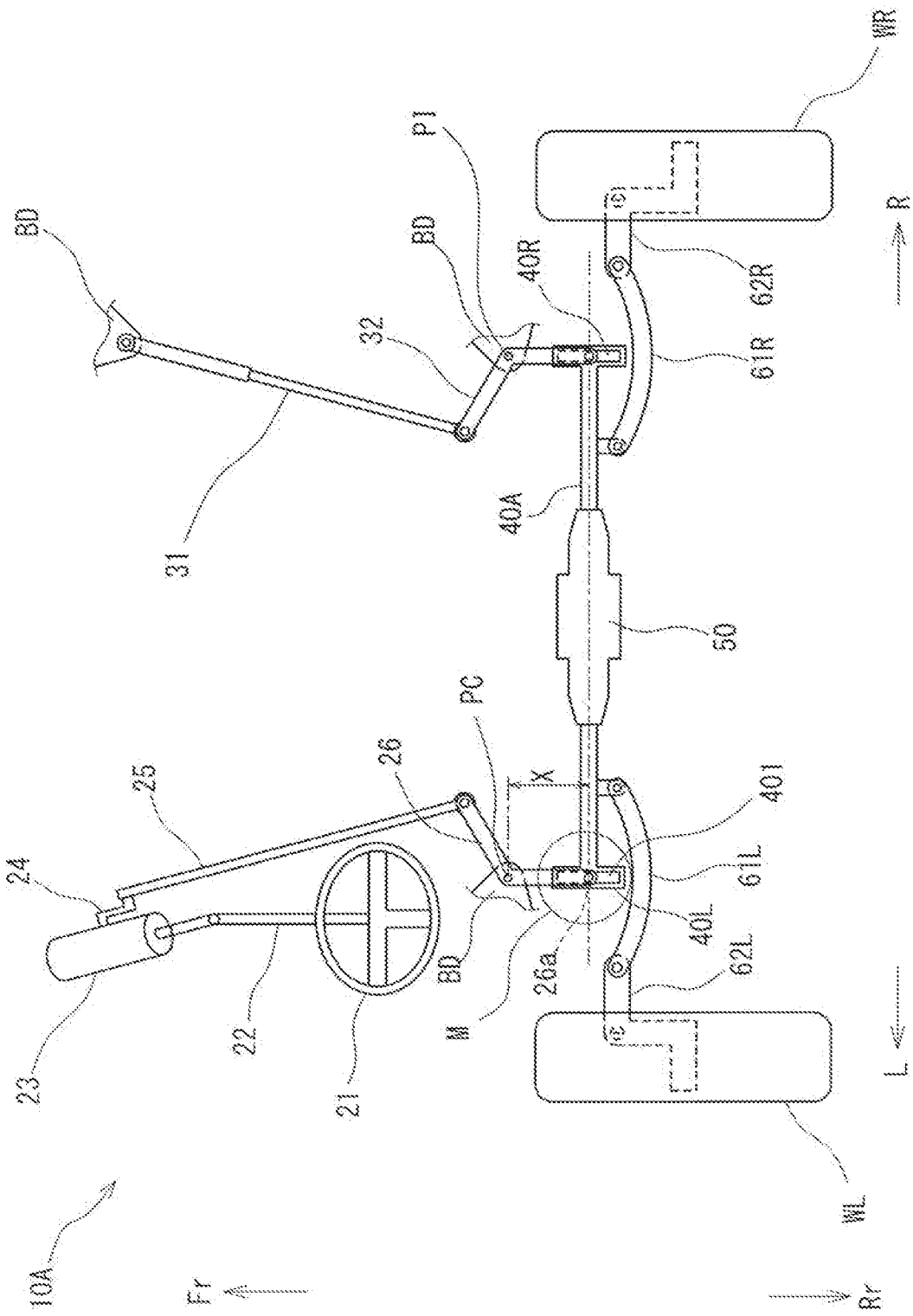
FIG. 1 is a view for schematically illustrating a configuration example of a steering device according to a first embodiment of the present invention.

As illustrated in FIG. 1, a steering device 10A according to a first embodiment of the present invention includes a steering wheel 21, a steering shaft 22, a steering gear box 23, a pitman arm 24, a drag link 25, and a center arm 26. Moreover, the steering device 10A includes a damper 31 and an idler arm 32. Further, the steering device 10A includes a rod member 40A, a rod-member drive device 50, a right tie rod 61R, a left tie rod 61L, a right knuckle arm 62R, and a left knuckle arm 62L. The rod member 40A is also referred to as "relay rod".

The steering wheel 21, the steering shaft 22, the steering gear box 23, the pitman arm 24, the drag link 25, and the center arm 26 (excluding the coupling structure between the center arm 26 and the rod member 40A) are well known. Therefore, a brief description thereof is now given.

The steering wheel 21 is fixed to the steering shaft 22. The steering shaft 22 is supported rotatably with respect to a vehicle body BD, and is configured to rotate together with the steering wheel 21.

The steering gear box 23 is configured to convert rotation of the steering wheel 21, which is transmitted through the steering shaft 22, into a swing of the pitman arm 24. More specifically, the steering gear box 23 is a gear box of a ball-nut type, and includes an input shaft (worm shaft), a ball nut, and an output shaft (sector shaft). The input shaft is coupled to the steering shaft 22. The output shaft is coupled to the pitman arm 24. A thread groove is formed in the input shaft. Balls of the ball nut engage with the thread groove of the input shaft. Thus, the ball nut moves in an axial direction when the input shaft rotates. The output shaft includes a sector gear configured to engage with the ball nut. A rotation shaft of the sector gear is coupled to the pitman arm. Thus, when the ball nut moves in the axial direction, the output shaft rotates, and the pitman arm 24 consequently swings. That is, the steering gear box 23 is configured to reduce the speed of the rotation of the steering shaft 22 through use of the ball nut and transmit the rotation to the pitman arm 24, to thereby swing the pitman arm 24.

The drag link 25 is configured to transmit the swing of the pitman arm 24 to the center arm 26. The drag link 25 is a member having a shape of an elongated rod. One end portion thereof is rotatably coupled to a distal end portion of the pitman arm 24. Another end portion thereof is rotatably coupled to a front side end portion of the center arm 26.

The center arm 26 is also referred to as a first link member or a first swing member, and is a bell crank having a substantially L shape bent at a middle portion as seen in the up-and-down direction. The center arm 26 is rotatably coupled to (supported by) the vehicle body BD at the bent portion in parallel with a predetermined plane (plane intersecting the up-and-down direction, and a horizontal plane in this example). A point (fulcrum) at which the bent portion is rotatably supported by the vehicle body BD is also referred to as "swing center point PC of the center arm 26". When the steering wheel 21 rotates, the pitman arm 24 swings, and the swing is transmitted to the center arm 26 through the drag link 25. As a result, a rear-side end portion of the center arm 26 moves along an arc-shaped path about the swing center point PC of the center arm 26. That is, the rear-side end portion of the center arm 26 swings in a substantially right-and-left direction of the vehicle body BD as the steering wheel 21 rotates. The rear-side end portion of the center arm 26 is coupled to a left-side end portion of the rod member 40A so as to be rotatable with respect to the rod member 40A, and so as to be movable relative to the rod member 40A in a direction parallel with the above-mentioned predetermined plane as detailed later (see FIG. 4 and FIG. 5).

The damper 31 and the idler arm 32 (excluding the coupling structure between the idler arm 32 and the rod member 40A) are also well known. Therefore, a brief description thereof is now given.

The damper 31 is a member having a shape of an elongated rod and being extendable and contractible in a length direction, and is a member configured to couple the idler arm 32 and the vehicle body 80 to each other. More specifically, a front-side end portion of the damper 31 in the length direction is rotatably coupled to the vehicle body BD. A rear-side end portion of the damper 31 in the length direction is coupled to a front-side end portion of the idler arm 32 rotatably with respect to the idler arm 32.

The idler arm 32 is a bell crank having a shape symmetrical with a shape of the center arm 26 in the right-and-left direction, and is also referred to as a second link member or a second swing member. The idler arm 32 is rotatably coupled to (supported by) the vehicle body BD at its bent portion in parallel with the above-mentioned predetermined plane (plane intersecting the up-and-down direction, and the horizontal plane in this example). A point (fulcrum) at which the bent portion of the idler arm 32 is rotatably supported by the vehicle body BD is also referred to as "swing center point PI of the idler arm 32". A rear-side end portion of the idler arm 32 is coupled to a right-side end portion of the rod member 40A so as to be rotatable with respect to the rod member 40A, and so as to be movable relative to the rod member 40A in the direction parallel with the above-mentioned predetermined plane. The coupling structure between the idler arm 32 and the rod member 40A is the same structure as the coupling structure between the center arm 26 and the rod member 40A (see FIG. 4 and FIG. 5), which is detailed later. When the rod member 40A moves in the right-and-left direction of the vehicle body BD, the idler arm 32 swings as the rod member 40A moves, and the damper 31 swings while extending and contracting.

Figure 2:
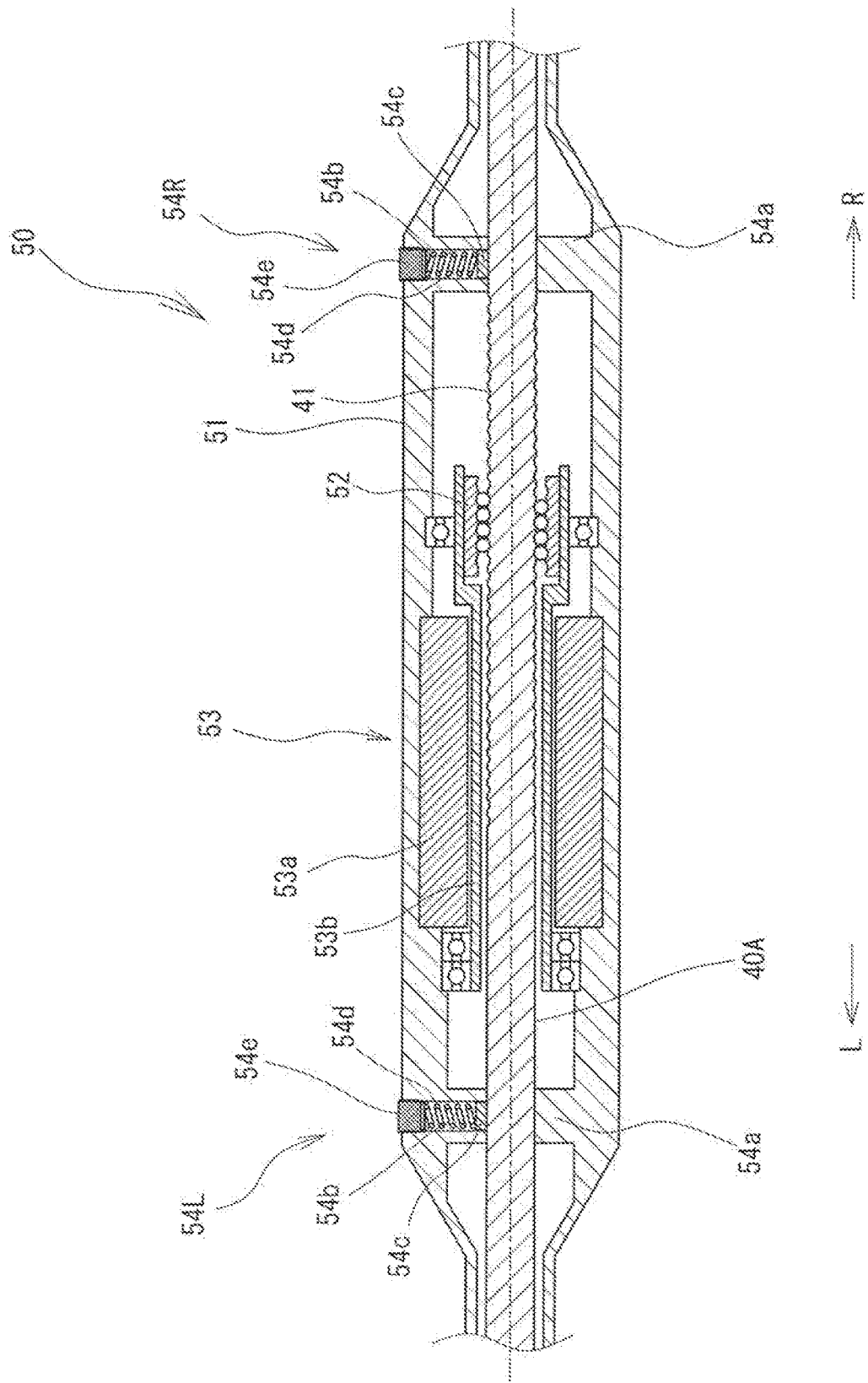
FIG. 2 is a sectional view for schematically illustrating a configuration example of a first rod member drive device.

The rod member 40A is a member having a shape of an elongated rod (columnar shape), and is arranged such that a length direction thereof is parallel with the right-and-left direction of the vehicle body BD. That is, the length direction of the rod member 40A (axial direction of the rod member 40A) matches the right-and-left direction of the vehicle body BD. The rod member 40A is supported by a first right-side rod member guide 54R and a first left-side rod member guide 54L, which are illustrated in FIG. 2 and described later, with respect to the vehicle body BD (actually a gear housing 51 illustrated in FIG. 2). More specifically, the rod member 40A is supported through the first right-side rod member guide 54R and the first left-side rod member guide 54L such that the rod member 40A is allowed to linearly reciprocate in the right-and-left direction of the vehicle body BD with respect to the vehicle body BD but is restricted in movement in the up-and-down direction and the front-and-rear direction of the vehicle body BD with respect to the vehicle body BD. As described above, the left-side end portion of the rod member 40A is coupled to the rear-side end portion of the center arm 26. The right-side end portion of the rod member 40A is coupled to the rear-side end portion of the idler arm 32.

The rod-member drive device 50 is a drive device including an electric motor 53. The rod member 40A is inserted through the rod-member drive device 50. The rod-member drive device 50 is configured to directly transmit a driving force generated by the electric motor 53, which is a driving source for the rod-member drive device 50, to the rod member 40A, to thereby linearly move the rod member 40A in the right-and-left direction of the vehicle body BD. Thus, the rod-member drive device 50 is capable of generating a steering assist force by generating a driving force corresponding to torque applied to the steering shaft 22. Further, the rod-member drive device 50 is capable of performing autonomous driving by changing turning angles (steered angles) of steered wheels WR and WL through use of the driving force generated by the drive source. A detailed description of the rod-member drive device 50 is given later (see FIG. 2).

The right tie rod 61R is a member configured to couple the rod member 40A and the right knuckle arm 62R to each other. More specifically, a vehicle inner end portion of the right tie rod 61R is rotatably coupled to the rod member 40A at a position between the right-side end portion of the rod member 40A and the rod-member drive device 50. A vehicle outer end portion of the right tie rod 61R is rotatably coupled to the right knuckle arm 62R configured to be rotatable with respect to the vehicle body BD.

The left tie rod 61L is a member configured to couple the rod member 40A and the left knuckle arm 62L to each other. More specifically, a vehicle inner end portion of the left tie rod 61L is rotatably coupled to the rod member 40A at a position between the left-side end portion of the rod member 40A and the rod-member drive device 50. A vehicle outer end portion of the left tie rod 61L is rotatably coupled to the left knuckle arm 62L configured to be rotatable with respect to the vehicle body BD.

The right knuckle arm 62R is configured to rotatably support the right steered wheel WR. The left knuckle arm 62L is configured to rotatably support the left steered wheel WL. Thus, when the rod member 40A linearly moves in the right-and-left, direction of the vehicle body BD, the turning angles (steered angles) of the steered wheels WR and WL are changed.

As illustrated in FIG. 2, the rod member drive device 50 includes the gear housing 51, a ball nut 52, the electric motor 53, and the above-mentioned first right-side rod member guide 54R and first left-side rod member guide 54L.

The gear housing 51 is a housing for the rod-member drive device 50. The gear housing 51 is a cylindrical body, and is fixed to the vehicle body BD such that an axis thereof matches the right-and-left direction of the vehicle body BD. The gear housing 51 internally includes the first right-side rod member guide 54R and the first left-side rod member guide 54L. Further, the gear housing 51 accommodates the ball nut 52 and the electric motor 53. As described above, the rod member 40A is inserted through the gear housing 51 in the right-and-left direction.

The ball nut 52 is arranged on an outer periphery of the rod member 40A. A thread groove 41 is formed in an outer periphery of a portion of the rod member 40A located inside the gear housing 51. Balls of the ball nut 52 are engaged with the thread groove 41. That is, the ball nut 52 is rotatably mounted on the rod member 40A through intermediation of the balls. In other words, the rod member 40A functions as a screw shaft of a ball screw. When the ball nut 52 rotates, the rod member 40A linearly moves in the right-and-left direction of the vehicle body BD (that is, the length direction of the rod member 40A).

The electric motor 53 is the drive source of the rod member 40A, and includes a stator 53a and a rotor 53b. The stator 53a is fixed to the gear housing 51. The rotor 53b is a hollow shaft having a through hole extending in the axial direction. The rod member 40A is coaxially and rotatably inserted through the rotor 53b. The ball nut 52 is mounted to the rotor 53b so as to rotate together.

When the rotor 53b and the ball nut 52 are rotated by the driving force (magnetic force generated by the stator 53a) of the electric motor 53, the rod member 40A linearly moves in the right-and-left direction (length direction of the rod member 40A) with respect to the vehicle body BD (gear housing 51). As described above, the rod-member drive device 50 is configured to directly apply the force of the electric motor 53 to the rod member 40A so as to linearly move the rod member 40A in the right-and-left direction, thereby being capable of changing the turning angles of the right and left steered wheels WR and WL.

The first right-side rod member guide 54R and the first left-side rod member guide 54L have the same structure. Thus, description is now given of the first right-side rod member guide 54R (also simply referred to as "right-side guide 54R").

Figure 3:
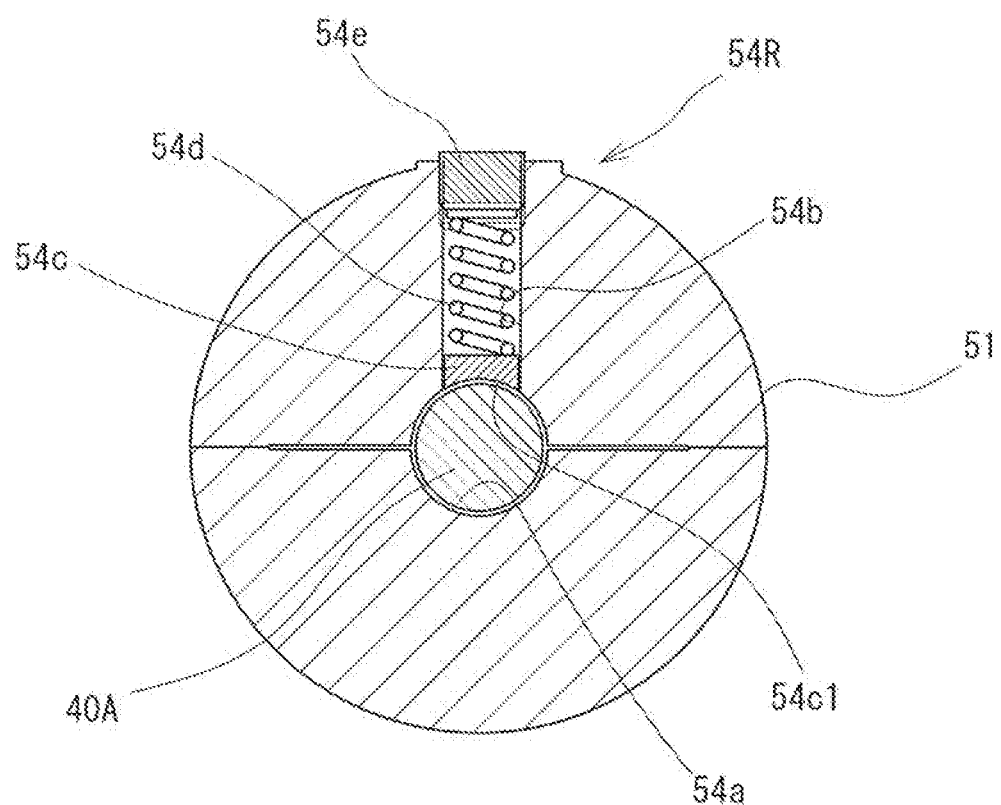
FIG. 3 is a sectional view for illustrating a first rod member guide.

As illustrated in FIG. 3, which is a sectional view of the right-side guide 54R on a plane orthogonal to the right-and-left direction of the rod member 40A, the right-side guide 54R includes a rod guide portion 54a, a hole 54b, a guide member 54c, a first rod-member biasing member 54d, and a plug 54e.

The rod guide portions 54a are parts of the gear housing 51, and are portions extending toward a center axis of the gear housing 51. A groove having an arc-shaped cross section and extending in the right-and-left direction of the vehicle body BD is formed in a top surface of the rod guide portion 54a. A radius of the groove of the rod guide portion 54a substantially matches a radius of the rod member 40A. Thus, the rod member 40A is engaged with the rod guide portion 54a such that the rod member 40A is allowed to relatively move in the right-and-left direction and rotate about the axis thereof.

The hole 54b is formed to extend from an outer periphery of the gear housing 51 toward the rod guide portion 54a. The guide member 54c and the first rod-member biasing member 54d are inserted into the hole 54b.

The guide member 54c is a member having a substantially rectangular parallelepiped shape. An engagement groove 54c1 in abutment against the rod member 40A is formed in the guide member 54c. The engagement groove 54c1 is a groove having an arc-shaped cross section and extending in the right-and-left direction so as to be opposed to the groove of the rod guide portion 54a. A radius of the engagement groove 54c1 substantially matches the radius of the rod member 40A.

The first rod-member biasing member 54d is a compression coil spring, and is a member configured to bias the guide member 54c toward the rod member 40A.

The plug 54e is a member configured to threadedly engage with a thread groove formed in an inner peripheral surface of the hole 54b and in a vicinity of the outer periphery of the gear housing 51, to thereby close the hole 54b. When the plug 54e is mounted, the first rod-member biasing member 54d biases the guide member 54c toward the rod member 40A. The plug 54e is a screw, and is configured so that an insertion amount into the gear housing 51 can be changed through rotation of the plug 54e. Moreover, the biasing force of the first rod-member biasing member 54d for biasing the rod member 40A can be changed by changing the insertion amount. The biasing force of the rod-member biasing member 54d has great influence on controllability, steering feeling, and performance of the device. Therefore, with this configuration, management of the biasing force becomes easier, and management of the controllability, the steering feeling, and the performance of the device consequently becomes easier.

In the right-side guide 54R, the rod member 40A is sandwiched by the rod guide portion 54a and the guide member 54c from sides opposed to each other in the direction perpendicular to the length direction of the rod member 40A. Further, the rod member 40A is biased by the first rod member biasing member 54d using the biasing force of the first rod-member biasing member 54d toward the rod guide portion 54a. Therefore, the rod member 40A is maintained in a state in which the rod member 40A is in abutment against the rod guide portion 54a by the biasing force of the first rod-member biasing member 54d when an external force other than the biasing force by the first rod-member biasing member 54d is not applied. That is, the rod member 40A is maintained in a state in which the rod member 40A is positioned with respect to the gear housing 51 in the directions perpendicular to the length direction (axis) of the rod member 40A (that is, the front-and-rear direction and the up-and-down direction).

Thus, the right-side guide 54R allows the linear movement of the rod member 40A in the right-and-left direction but restricts the movement in the front-and-rear direction and the up-and-down direction. More specifically, the rod member 40A cannot move (are constrained in movement) in the directions different from the direction (axial direction of the first rod-member biasing member 54d) in which the first rod-member biasing member 54d is elastically deformable with respect to the gear housing 51 (that is, the vehicle body BD). Meanwhile, the movement of the rod member 40A is restricted by the first rod-member biasing member 54d in the elastically deformable direction thereof, but when an external force larger than the biasing force of the first rod-member biasing member 54d is applied to the rod member 40A in the axial direction of the first rod-member biasing member 54d, the rod member 40A can move in the axial direction of the first rod-member biasing member 54d. With this configuration, generation of noise can be prevented or suppressed when the rod member 40A operates. The first left-side rod member guide 54L has the same function as that of the right-side guide 54R.

Figure 4:
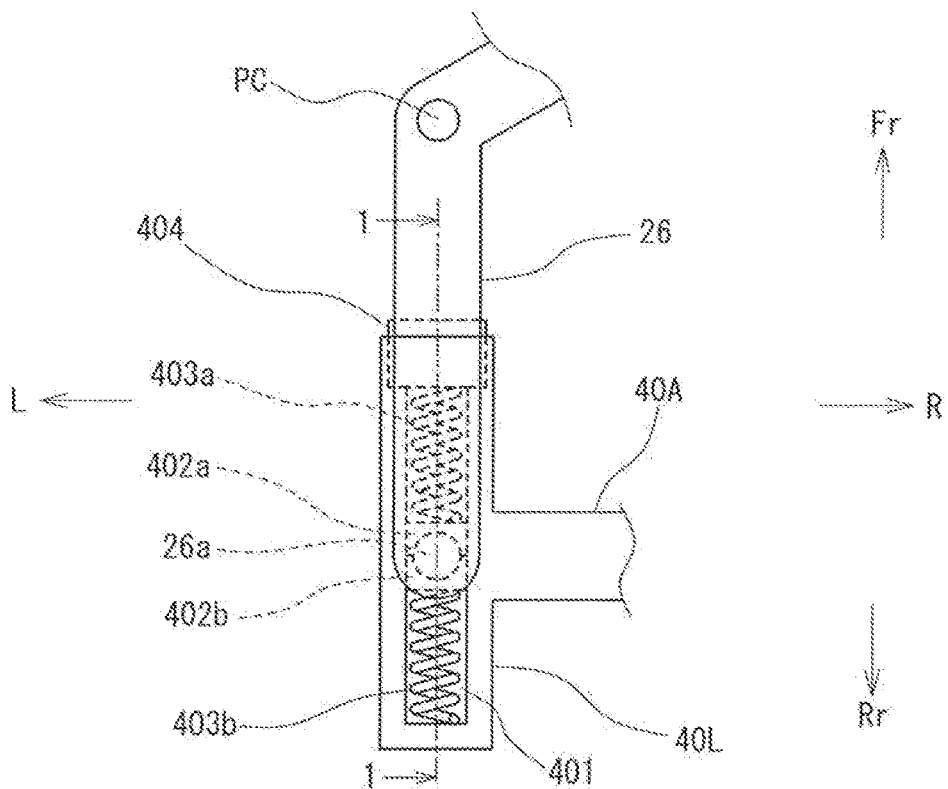
FIG. 4 is a view for schematically illustrating the coupling structure between one end portion of a center arm and a rod member.
Figure 5:
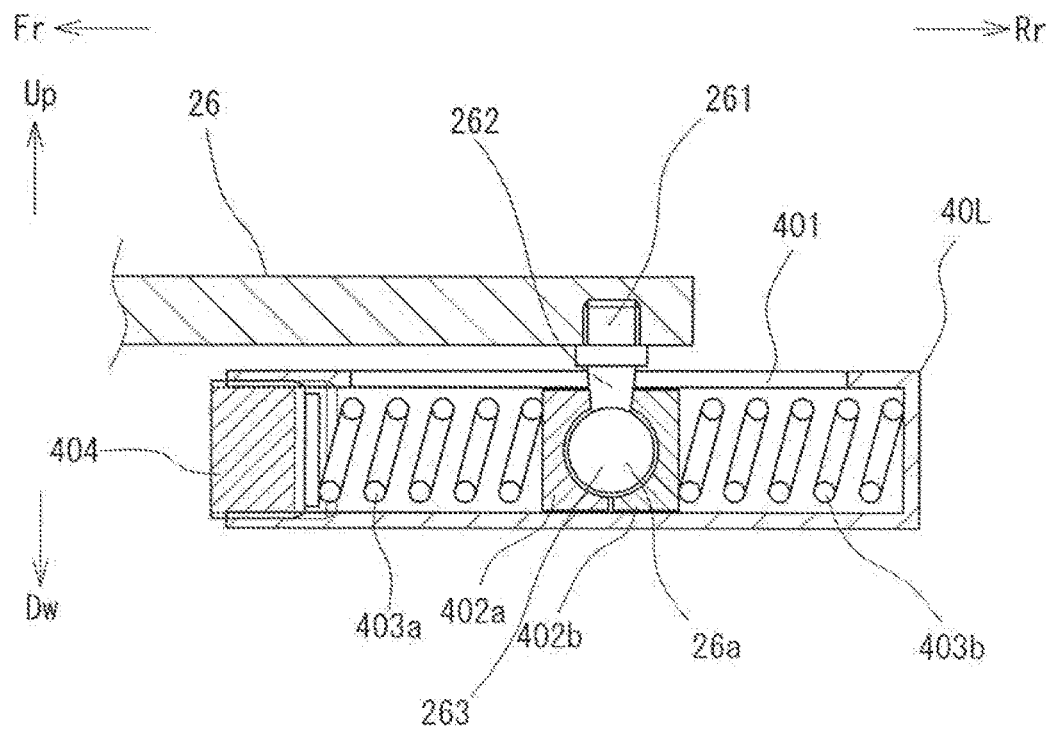
FIG. 5 is a sectional view for schematically illustrating the coupling structure between the one end portion of the center arm and the rod member.

With reference to FIG. 1, FIG. 4, which is an enlarged view of a portion M of FIG. 1, and FIG. 5, which is a sectional view as seen in a direction indicated by the arrows of the line 1-1 of FIG. 4, description is given of the coupling structure between the center arm 26 and the rod member 40A.

As illustrated in FIG. 1, rod-like portions 40R and 40L each having a hollow columnar shape with a length direction in the front-and-rear direction of the vehicle body BD are formed in both of the end portions of the rod member 40A in the length direction, respectively. A rear side of each of the rod-like portions 40R and 40L is closed. A front side of each of the rod like portions 40R and 40L is opened.

As illustrated in FIG. 4 and FIG. 5, a long hole 401 is formed in a top surface of the rod-like portion 40L. The long hole 401 has a length direction in a direction (front-and-rear direction in this embodiment) parallel with a plane (horizontal plane in this embodiment) defined by the rod member 40A and the swing center point PC, and intersecting the length direction of the rod member 40A. For the convenience of description, the portion (rod like portion) 40L in which the long hole 401 is formed is referred to as "coupling portion 40L".

A coupling protrusion portion 26a projecting toward the coupling portion 40L is arranged in a rear-side end portion of the center arm 26. As illustrated in FIG. 5, the coupling protrusion portion 26a is a ball stud, and includes a base end portion 261, a middle portion 262, and a distal end portion 263. Moreover, the base end portion 261 of the ball stud is fixed to the center arm 26. The middle portion 262 extends in the up-and-down direction, to thereby couple the base end portion 261 and the distal end portion 263 to each other. The distal end portion 263 has a spherical shape, and is positioned inside the long hole 401 of the coupling portion 40R.

Further, as illustrated in FIG. 5, a pair of ball seats 402a and 402b and a pair of compression coil springs (coupling protrusion-portion biasing members) 403a and 403b are accommodated inside the coupling portion 40L (that is, the long hole 401). Further, the coupling portion 40L includes a coupling-portion plug 404 mounted to the coupling portion 40L so as to close an opening on a front side thereof. The coupling-portion plug 404 is a screw, and is configured so that an insertion amount into the coupling portion 40L can be changed.

Each of the pair of ball seats 402a and 402b is a block body, and is arranged so as to be movable inside the coupling portion 40L. The pair of ball seats 402a and 402b include, in surfaces opposite to each other, recessed portions each having a semispherical shape conforming to an outer shape of the distal end portion 263, and are configured to sandwich the distal end portion 263 by the recessed portions in the front-and-rear direction.

The compression coil spring 403a is arranged in a compressed state between the ball seat 402a and the coupling-portion plug 404. The compression coil spring 403b is arranged in a compressed state between the ball seat 402a and a rear-side end portion of the coupling portion 40L.

As a result, the coupling protrusion portion 26a (actually the distal end portion 263) is elastically biased toward a middle position of the long hole 401 in the length direction (for example, a center portion of the long hole 401 in the length direction). Thus, the coupling protrusion portion 26a (the rear-side end portion of the center arm 26) can reciprocate with respect to the rod member 40A in the length direction of the long hole 401. Further, biasing forces of the compression coil springs 403a and 403b for biasing the coupling protrusion portion 26a can be managed through adjustment of a degree of tightening the coupling-portion plug 404. The biasing forces of the compression coil springs 403a and 403b for biasing the coupling protrusion portion 26a have great influence on the controllability, the steering feeling, and the performance of the device. Therefore, with this configuration, management of the biasing forces becomes easier. Further, the coupling protrusion portion 26a is sandwiched by the pair of ball seats 402a and 402b so as to be swingable along a spherical surface about a center of the distal end portion 263 with respect to the coupling portion 40L.

Therefore, the rear-side end portion of the center arm 26 and the coupling portion 40L of the rod member 40A can move relative to each other in a direction along the spherical surface about the distal end portion 263 while maintaining the state in which the rear-side end portion of the center arm 26 and the coupling portion 40L are coupled to each other. Meanwhile, the relative movement between the coupling protrusion portion 26a (rear-side end portion of the center arm 26) and the coupling portion 40L of the rod member 40A is restricted in the right-and-left direction (length direction of the rod member 40A). Therefore, the position of the rod member 40A in the right-and-left direction is uniquely determined with respect to a swing angle of the center arm 26.

The coupling structure between the idler arm 32 and the rod member 40A is the same as the coupling structure between the center arm 26 and the rod member 40A except that those coupling structures are symmetrical in the right-and-left direction. Therefore, the rear-side end portion of the idler arm 32 and the coupling portion 40R of the rod member 40A can move relative to each other in a direction along a spherical surface about a distal end portion of a coupling protrusion portion of the idler arm 32 while maintaining the state in which the rear-side end portion of the idler arm 32 and the coupling portion 40R are coupled to each other. Meanwhile, the relative movement between the coupling protrusion portion of the idler arm 32 (rear-side end portion of the idler arm 32) and the coupling portion 40R of the rod member 40A is restricted in the right-and-left direction (length direction of the rod member 40A).

Incidentally, the center arm 26 and the idler arm 32 are rotatably coupled to the vehicle body BD, and the rear-side end portions thereof thus swing along respective arc-shaped paths. Therefore, when each of the center arm 26 and the idler arm 32, and the rod member 40A are coupled to each other so that each of the center arm 26 and the idler arm 32, and the rod member 40A are relatively rotatable, but are not relatively movable in the front-and-rear direction as in a related-art steering device, the rod member 40A moves not only in the right-and-left direction but also in the front-and-rear direction. Thus, in the related-art configuration, the rod-member drive device 50 configured to linearly move the rod member 40A in the right-and-left direction cannot be employed.

Meanwhile, in the steering device 10A, the rear-side end portions of the center arm 26 and the idler arm 32 are coupled to the rod member 40A so as to be relatively movable in the front-and-rear direction of the vehicle body BD. That is, the center arm 26 and the rod member 40A are coupled to or engaged with each other so that a distance X between the swing center point PC and the rod member 40A in the front-and-rear direction remains unchanged even when the center arm 26 swings with the swing center point PC as a fulcrum, and that the force in the right-and-left direction of the vehicle body BD is applied from the center arm 26 to the rod member 40A when the center arm 26 swings. Thus, the swing of the center arm 26 can be transmitted to the rod member 40A, which is allowed to linearly move in the right-and-left direction but restricted in movement in the front-and-rear direction. Thus, the steering device 10A can employ the rod-member drive device 50, which is engaged with the rod member 40A and is configured to directly (in other words, without interposition of other members between the steering wheel 21 and the rod member 40A) move the rod member 40A linearly in the right-and-left direction.

Further, as described above, the center arm 26 and the rod member 40A can move relative to each other in the direction along the spherical surface about the center of the distal end portion 263 of the coupling protrusion portion 26a. Similarly, the idler arm 32 and the rod member 40A can move relative to each other in the direction along the spherical surface about the center of the distal end portion of the coupling protrusion portion of the idler arm 32. Thus, even when relative directions between the center arm 26 and the idler arm 32, and the rod member 40A change due to flexure of the vehicle body BD or the like, the swing of the center arm 26 can smoothly be transmitted to the rod member 40A.

Further, the coupling protrusion portion 26a is elastically biased by the pair of compression coil springs 403a and 403b toward the position (middle position of the long hole 401 in the length direction) at which the biasing forces of the compression coil springs 403a and 403b balance with each other. Thus, the coupling protrusion portion 26a is allowed to move in the front-and-rear direction with respect to the rod member 40A (to move in the length direction of the long hole 401), and kickback transmitted from the side of the rod member 40A to the center arm 26 can be reduced. The same applies to the relationship between the idler arm 32 and the rod member 40A, and kickback transmitted from the side of the rod member 40A to the idler arm 32 can be reduced.

The configuration of the pair of ball seats 402a and 402b is not particularly limited, and a configuration having hitherto been publicly known can be applied. In short, it is only required that the pair of ball seats 402a and 402b be configured to rotatably support (sandwich) the distal end portion 263 of the ball stud. Moreover, there may be provided such a configuration that the ball stud is sandwiched by members other than the pair of ball seats 402a and 402b, further, in this embodiment, description is given of the example in which the ball stud is applied to the coupling protrusion portion 26a, but the coupling protrusion portion 26a is not limited to the ball stud. In short, it is only required that the center arm 26 and the coupling portion 40L of the rod member 40A be coupled to each other so as to allow a three dimensional change in relative direction. Moreover, it is only required that the idler arm 32 and the coupling portion 40R of the rod member 40A be coupled to each other so as to allow a three-dimensional change in relative direction.

Further, as the coupling structure between the center arm 26 and the idler arm 32, and the rod member 40A, description is given of the configuration in which the coupling protrusion portions formed in the rear-side end portions of the center arm 26 and the idler arm 32 are engaged with (inserted into) the long hole 401 formed in the rod member 40A, but the structure is not limited to this configuration. For example, it is possible to employ a configuration in which a long hole is formed in each of the rear-side end portions of the center arm 26 and the idler arm 32, and coupling protrusion portions similar to the coupling protrusion portion 26a are formed on the rod member 40A, and the coupling protrusion portions engage with the long holes.

Further, the coupling structure between each of the center arm 26 and the idler arm 32, and the rod member 40A is not limited to the combination of the coupling protrusion portion 26a and the long hole 401. For example, there may be provided such a configuration that each of the center arm 26 and the idler arm 32, and the rod member 40A are coupled to each other through other members. In short, it is only required that the rear-side end portion of each of the center arm 26 and the idler arm 32, and the rod member 40A be coupled to each other so as to be relatively movable in the front-and-rear direction of the vehicle body 80.

As described above, the steering device 10A according to the first embodiment is configured to be able to linearly move the rod member 40A in the right-and-left direction through use of the rod-member drive device 50, to thereby change the turning angles of the right and left steered wheels WR and WL. Moreover, the rod-member drive device 50 is configured to directly drive the rod member 40A. As a result, in the steering device 10A, a movement amount (drive amount) of the rod member 40A can directly be controlled by the rod-member drive device 50, and the turning angles of the steered wheels WR and WL can thus highly precisely be controlled. That is, in this embodiment, compared with the related-art configuration, it is possible to reduce the number of members configured to transmit the force and coupling members provided between the drive devices and the steered wheels WR and WL. Therefore, the influence of clearances, deformations, and the like of those members on the turning angles of the steered wheels WR and WL can be made small, and the turning angles of the steered wheels WR and WL can thus highly precisely be controlled.

Moreover, a layout of the steering wheel 21, the steering shaft 22, the steering gear box 23, the pitman arm 24, the drag link 25, the idler arm 32, the damper 31, the rod member 40A, the right and left tie rods 61R and 61L, and the right and left knuckle arms 62R and 62L are the same as a layout of a related-art steering device of a ball-nut type. Thus, for a vehicle of the cab-over-engine type to which a steering mechanism of the ball-nut type is applied, it is not required to greatly change the members forming the steering device, the layout thereof, or the vehicle body structure.

Further, with the steering device 10A, a drive device configured to linearly move the rod member 40A in the right-and-left direction (mechanism which does not allow the movement of the rod member 40A in the front-and-rear direction and the up-and-down direction) can be employed as the rod-member drive device 50. Therefore, a linear actuator such as a drive device including a ball screw can be applied to the rod-member drive device 50.

Moreover, the rod member 40A is elastically biased by the first right-side rod member guide 54R and the first left-side rod member guide 54L toward the rod guide portions 54a formed on the inner peripheral surface of the gear housing 51 in the direction perpendicular to the length direction of the rod member 40A. Thus, it is possible to prevent or suppress generation of noise when the rod member 40A moves while the rod member 40A is positioned with respect to the gear housing 51 (that is, the vehicle body BD).

Moreover, the rod-member drive device 50 is configured to rotate the ball nut 52 through use of the driving force of the electric motor 53, to thereby directly linearly move the rod member 40A in the right-and-left direction. Thus, the movement amount of the rod member 40A can highly precisely be controlled.

In this embodiment, the steering device 10A includes the idler arm 32 and the damper 31, but the idler arm 32 and the damper 31 can be omitted through use of the support of the rod member 40A by the gear housing 51.

Second Embodiment

Description is now given of a steering device 10B according to a second embodiment of the present invention. Components which are common to those in the first embodiment are denoted by the same reference symbols, and description thereof may be omitted.

Figure 6:
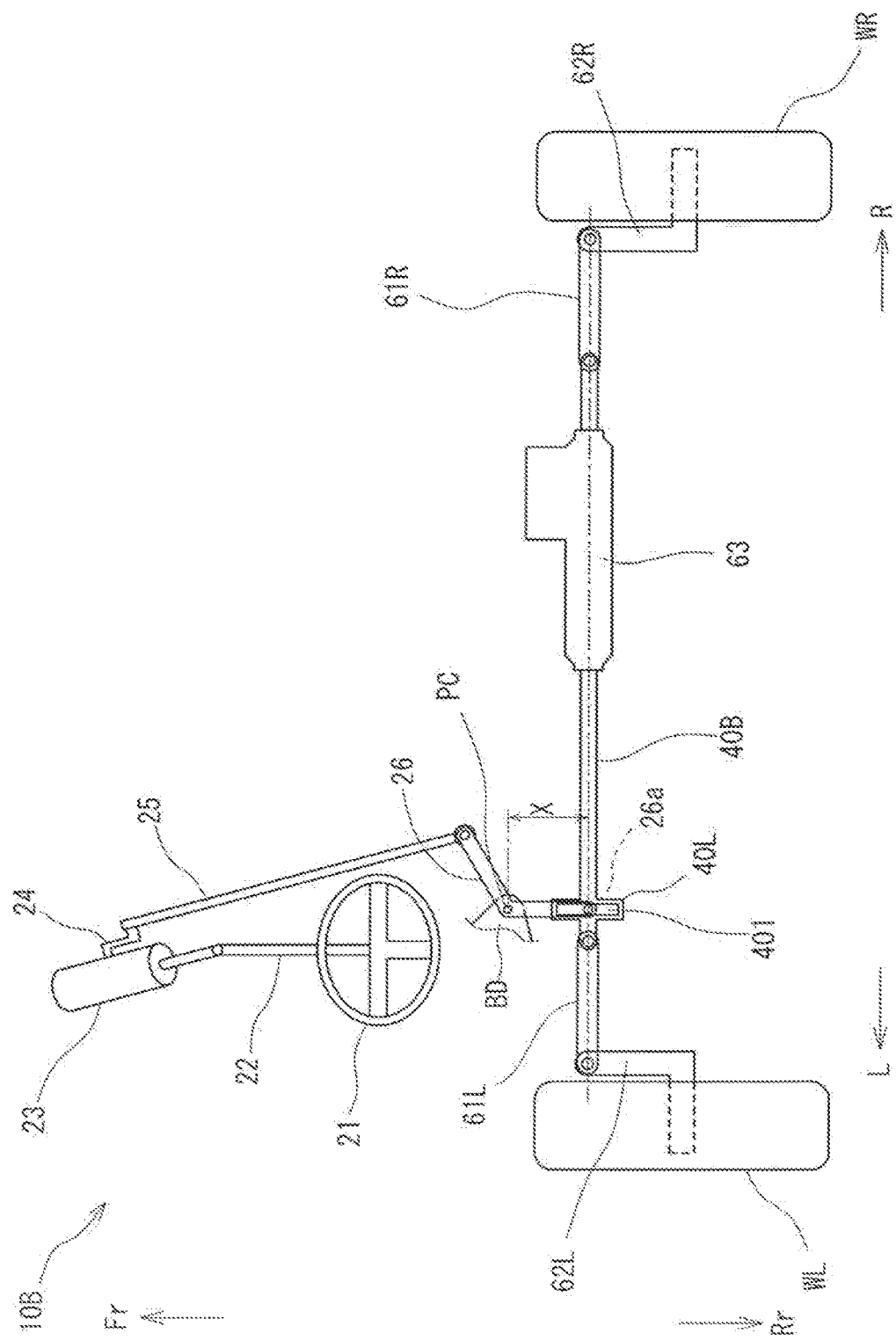
FIG. 6 is a view for schematically illustrating a configuration example of a steering device according to a second embodiment of the present invention.

As illustrated in FIG. 6, the steering device 10B according to the second embodiment includes the center arm 26, a rod member 40B, a rod-member drive device 63, the right and left tie rods 61R and 61L, the right and left, knuckle arms 62R and 62L, the steering wheel 21, the steering shaft 22, the steering gear box 23, the pitman arm 24, and the drag link 25. Moreover, the same configurations as those of the first embodiment can be applied to configurations of the steering wheel 21, the steering shaft 22, the steering gear box 23, the pitman arm 24, the drag link 25, and the center arm 26. Meanwhile, the steering device 10B according to the second embodiment does not include the idler arm 32 and the damper 31.

In the second embodiment, the coupling portion 40L of the rod member 40B is provided not in the end portion in the length direction, but at a position apart from the end portion toward the center in the length direction. Moreover, the right and left tie rods 61R and 61L are coupled to both of end portions of the rod member 40B in the length direction, respectively. However, the same configuration as that of the first embodiment can be applied to the coupling portion 40L of the rod member 40B. Therefore, description of the coupling portion 40L is omitted.

Figure 7:
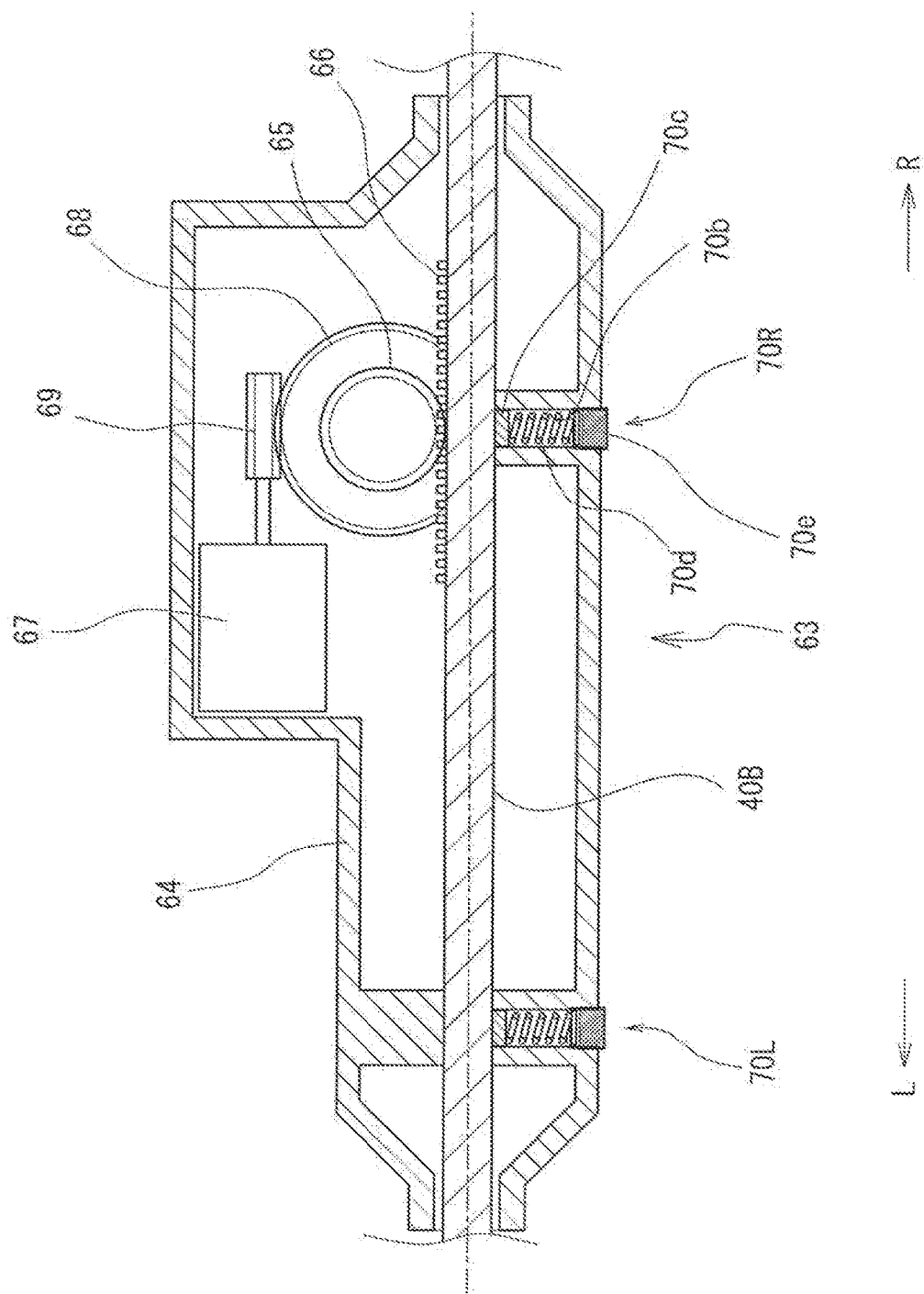
FIG. 7 is a sectional view for schematically illustrating a configuration example of a rod-member drive device.

Description is now given of a configuration example of the rod-member drive device 63 in the second embodiment. As illustrated in FIG. 7, which is a sectional view of the rod-member drive device 63, the rod member drive device 63 includes a gear housing 64, a pinion 65, a rack 66, and an electric motor 67.

The gear housing 64 is a housing for the rod-member drive device 63. The electric motor 67 and the pinion 65 are accommodated inside the gear housing 64. Moreover, the rod member 40B is inserted through the inside of the gear housing 64 so as to be linearly movable in the right-and-left direction. A second right-side rod member guide 70R and a second left-side rod member guide 70L are provided inside the gear housing 64 at positions apart from each other in the right-and-left direction. Moreover, the second right-side rod member guide 70R and the second left-side rod member guide 70L allow movement of the rod member 40B in the right-and-left direction but restrict movement of the rod member 40B in the front-and-rear direction and the up-and down direction. It is only required that the gear housing 64 be configured to accommodate the electric motor 67 and the pinion 65 and support the rod member 40B so as to be linearly movable in the right-and-left direction, and a specific configuration thereof is not particularly limited.

The pinon 65 is rotatably accommodated inside the gear housing 64. The pinion 65 is configured to be rotated by a driving force of the electric motor 67. For example, a worm wheel 68 is formed coaxially and integrally with the pinion 65. The worm wheel 68 meshes with a worm 69 provided on a rotation shaft of the electric motor 67. Moreover, the rack 66 is formed on an outer periphery of the rod member 40B so as to be arranged in line in the length direction of the rod member 40B. Moreover, the rack 66 of the rod member 40B and the pinion 65 mesh with each other. Further, when the pinion 65 is rotated by the driving force of the electric motor 67, the rod member 40B linearly moves in the right-and-left direction as the pinion 65 rotates. With this configuration, the rod member 40B can be linearly moved in the right-and-left direction by the rod-member drive device 63. That is, the turning angles of the right and left steered wheels WR and WL can be changed by the rod-member drive device 63.

Figure 8:
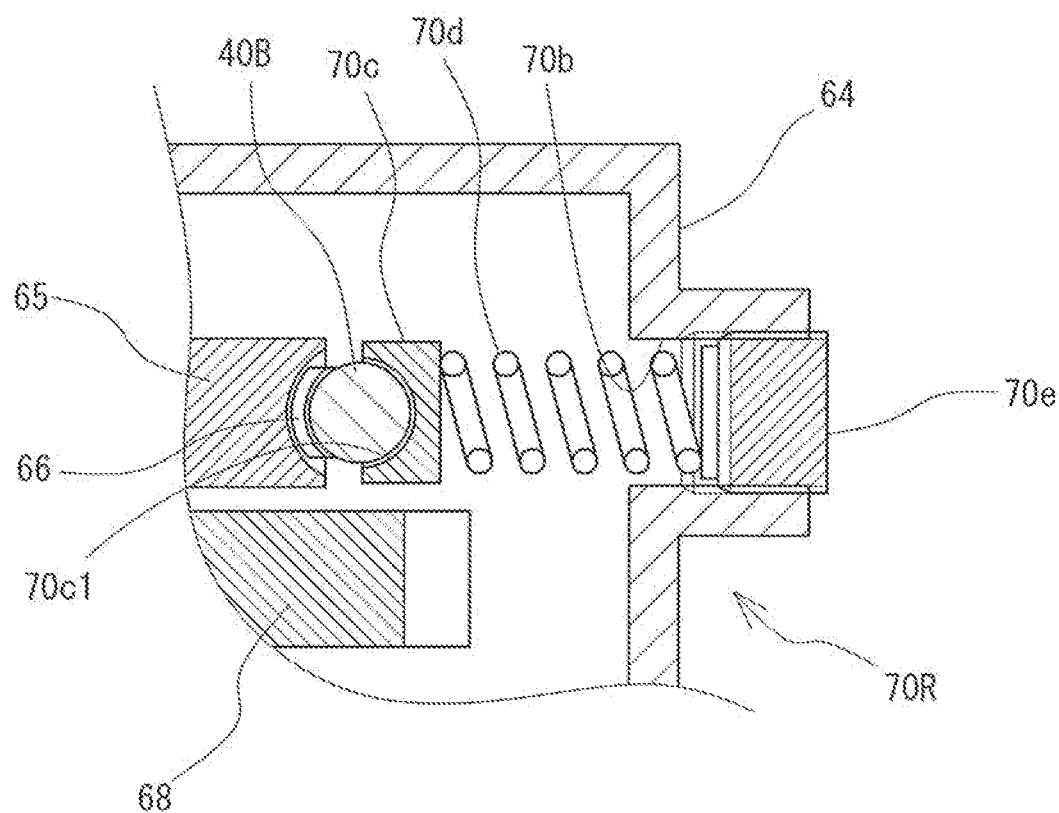
FIG. 8 is a sectional view for illustrating a second rod member guide.

Description is now given of a configuration example of the second right-side rod member guide 70R. The second left side rod member guide 70L has the same configuration as that of the first left-side rod member guide 54L, and description thereof is therefore omitted. As illustrated in FIG. 8, the second right-side rod member guide 70R includes a guide member 70c and a second rod-member biasing member 70d arranged inside the gear housing 64.

The guide member 70c is a member configured so as to be able to engage with an outer periphery of the rod member 40B and so as to be relatively movable in the right-and-left direction with respect thereto. For example, a block body including a groove 70c1 formed so as to extend in the right-and-left direction can be applied to the guide member 70c. The groove 70c1 has an arc-shaped cross section. The second rod-member biasing member 70d is a member configured to bias the rod member 40B toward the side of the pinion 65. For example, a compression coil spring is applied to the second rod-member biasing member 70d. The guide member 70c and the second rod-member biasing member 70d are arranged on a side opposite to the pinion 65 across the rod member 40B. Moreover, the second rod-member biasing member 70d is configured to bias the rod member 40B together with the guide member 70c toward the side of the pinion 65. As in the first right-side rod member guide 54R, a hole 70b causing the outside and the inside of the gear housing 64 to communicate with each other is formed in the gear housing 64. The guide member 70c and the second rod-member biasing member 70d can be accommodated inside the gear housing 64 through the hole 70b. A female thread is formed in the hole 70b. A plug 70e serving as a lid is fastened to the female thread. Moreover, a biasing force of the second rod-member biasing member 70d for biasing the rod member 40B can be managed through adjustment of a degree of tightening the plug 70e. That is, preload between the rack 66 and the pinion 65 can be managed. The preload between the rack 66 and the pinion 65 has great influence on controllability, steering feeling, and performance of the device. Therefore, with this configuration, management of the preload becomes easier, and management of the controllability, the steering feeling, and the performance of the device consequently becomes easier.

Moreover, the second right-side rod member guide 70R and the second left-side rod member guide 70L are provided at the positions apart from each other in the right-and-left direction. The second left-side rod member guide 70L is provided at a position apart toward the left side from a position at which the rack 66 and the pinion 65 mesh with each other. The second right-side rod member guide 70R is provided at the position at which the rack 66 and the pinion 65 mesh with each other. Moreover, the second right-side rod member guide 70R and the second left-side rod member guide 70L allow the linear movement of the rod member 40B in the right-and-left direction but restrict movement in the front-and-rear direction and the up-and-down direction. Further, in a state in which an external force other than the second rod-member biasing member 70d is not applied to the rod member 40B, the rod member 40B is maintained in a state in which the rod member 40B is positioned with respect to the gear housing 64 and the rack 66 by the biasing force of the second rod-member biasing member 70d. More specifically, the rod member 40B cannot move in the up-and-down direction (the movement in the up-and-down direction is constrained) with respect to the gear housing 64 (that is, the vehicle body BD). Meanwhile, the movement in the direction of the biasing force of the second rod-member biasing member 70d (direction in which the second rod-member biasing member 70d can elastically be compressed and deformed) is restricted by the biasing force of the second rod member biasing member 70d, but the movement occurs when an external force larger than the biasing force is applied. With this configuration, generation of noise can be prevented or suppressed when the rod member 40B operates.

As described above, the steering device 10B according to the second embodiment is configured to be able to linearly move the rod member 40B in the right-and-left direction through use of the rod-member drive device 63, to thereby change the turning angles of the right and left steered wheels WR and WL. Moreover, the rod-member drive device 63 is configured to directly drive the rod member 40B. With this configuration, the same effects as those in the first embodiment can be achieved. Moreover, the idler arm 32 and the damper 31 can be omitted through use of the support of the rod member 40B by the gear housing 64 (the same applies to the first embodiment).

At least one embodiment of the present invention has been described, but the present invention is not limited to the above-mentioned at least one embodiment, and various modification examples based on the technical idea of the present invention may also be employed.

For example, in above-mentioned embodiments, description is given of the configurations in which the electric motors 53 and 67 are applied as the drive sources of the rod-member drive devices 50 and 63, respectively, but the drive sources of the rod-member drive devices 50 and 63 are not limited to the electric motors 53 and 67. It is only required that those drive sources be configured to be able to output rotational driving forces, and publicly-known various drive sources can be applied.

Moreover, in the first embodiment, as illustrated in FIG. 1, description is given of the example in which the center arm 26 is coupled to the one end portion of the rod member 40A in the length direction, and the idler arm 32 is coupled to the another end portion thereof. However, the positions at which the center arm 26 and the idler arm 32 are coupled are not limited to the positions illustrated in FIG. 1. The center arm 26 and the idler arm 32 may be coupled to middle positions of the rod member 40A in the length direction. Meanwhile, in the second embodiment, as illustrated in FIG. 6, description is given of the configuration in which the coupling portion 40L is provided at the position on the center side with respect to the end portion of the rod member 40B in the length direction, and the right and left tie rods 61R and 61L are coupled to the both end portions, respectively, but the coupling positions are not limited to this configuration. As in the first embodiment, the coupling portion 40L may be provided in the end portion of the rod member 40B in the length direction, and the right and left tie rods 61R and 61L may be coupled at positions closer to the center with respect to the both end portions, respectively.

The configurations of the right and left tie rods 61R and 61L, the right and left knuckle arms 62R and 62L, and the right and left steered wheels WR and WL are not particularly limited, and various configurations publicly known in the related art can be applied.

Moreover, it is only required that the gear housing 51 of the rod-member drive device 50 in the first embodiment be able to accommodate the electric motor 53 and the ball nut 52 and movably support the rod member 40A in the right-and-left direction by the first left-side rod member guide 54L and the first right-side rod member guide 54R, and a specific configuration is not particularly limited. Moreover, the configuration of the thread groove 41 of the rod member 40A and the ball nut 52 (that is, the ball screw) is not particularly limited, and various configurations publicly known in the related art can be applied.

Similarly, it is only required that the gear housing 64 in the second embodiment be able to accommodate the electric motor 67 and the pinion 65 and movably support the rod member 40B in the right-and-left direction by the second left-side rod member guide 70L and the second right-side rod member guide 70R, and a specific configuration is not particularly limited. Moreover, the configurations of the pinon 65 and the rack 66 of the rod member 40B are not particularly limited, and various configurations publicly known in the related art can be applied.

Moreover, the long hole 401 formed in the coupling portion 40R may be a through hole or a groove which is opened on one side (side opposed to the center arm 26 or the idler arm 32), and has a bottom. Moreover, in the above-mentioned embodiments, description is given of the example in which the long hole 401 is parallel with the front-and-rear direction, but the length direction of the long hole 401 may be inclined with respect to the front-and-rear direction.

Moreover, in the above-mentioned embodiments, description is given of a so-called left-hand drive vehicle in which the steering wheel 21 is arranged on the left side in the vehicle widthwise direction, but the present invention can be applied to a right-hand drive vehicle. In this case, it is only required that shapes and arrangements of the respective members be symmetrical with those in the respective embodiments in the right-and-left direction.

What is claimed is:

1. A steering device for a vehicle, comprising:
   a steering gear box configured to convert rotation of a steering wheel to a swing of a pitman arm;
   a swing member, which is supported with respect to a vehicle body so as to be swingable at a predetermined swing center point the vehicle body, and is coupled to the pitman arm, the swing member being configured to swing with the swing center point as a fulcrum in synchronism with the pitman arm;
   a rod member, which is coupled to the swing member, a left knuckle arm configured to support a left steered wheel, and a right knuckle arm configured to support a right steered wheel, and is restricted in movement in a front-and-rear direction and supported so as to move in a right-and-left direction of the vehicle body with respect to the vehicle body, the rod member being configured to move in the right-and-left direction, to thereby change turning angles of the left steered wheel and the right steered wheel;
   a rod-member drive device, which is engaged with the rod member, and is configured to generate power for moving the rod member in the right-and-left direction of the vehicle body; and
   a guide member configured to allow the movement of the rod member in the right-and-left direction of the vehicle body and restrict movement of the rod member in the front-and-rear direction of the vehicle body and an up-and-down direction of the vehicle body,
   wherein the swing member is coupled to or engaged with the rod member so as to be relatively movable in the front-and-rear direction of the vehicle body and so that a distance between the swing center point and the rod member remains unchanged even when the swing member swings, and that a force in the right-and-left direction of the vehicle body is applied from the swing member to the rod member when the swing member swings.

2. The steering device according to claim 1,
   wherein the rod member includes a coupling portion having a long hole, which is parallel with a plane defined by the rod member and the swing center point, and has a length direction in a predetermined direction intersecting an axis of the rod member,
   wherein the swing member includes a coupling protrusion portion, which projects from the swing member, and has a distal end portion inserted into the long hole so as to relatively move in the length direction of the long hole, and
   wherein the swing member and the rod member are coupled to each other through the coupling portion and the coupling protrusion portion.

3. The steering device according to claim 2,
   wherein the predetermined direction is the front-and-rear direction of the vehicle body.

4. The steering device according to claim 2,
   wherein the distal end portion of the coupling protrusion portion is a spherical body, and is configured to move in the length direction of the long hole and turn along a surface of the spherical body with respect to the rod member, and
   wherein the coupling portion includes a coupling-protrusion-portion biasing member configured to elastically bias the distal end portion to a middle position of the long hole in the length direction.

5. The steering device according to claim 1,
   wherein the guide member is configured to elastically bias the rod member in a direction perpendicular to an axial direction of the rod member through use of a biasing force of a rod-member biasing member.

6. The steering device according to claim 1,
   wherein the rod-member drive device includes:
   a drive source;
   a thread groove formed in an outer peripheral surface of the rod member; and
   a ball nut, which is mounted to an outer periphery of the rod member so as to rotate relative to the rod member, and is configured to engage with the thread groove through intermediation of balls, and
   wherein the drive source is configured to drive the ball nut to rotate, to thereby linearly move the rod member.

7. The steering device according to claim 1,
   wherein the rod-member drive device includes:
   a drive source;
   a rack formed in an outer peripheral surface of the rod member along a length direction of the rod member; and
   a pinion, which is supported so as to rotate with respect to the vehicle body, and is configured to mesh with the rack, and
   wherein the drive source is configured to drive the pinion to rotate, to thereby linearly move the rod member in the right-and-left direction of the vehicle body.

* * * * *